(12) United States Patent
Kobayashi

(10) Patent No.: US 11,390,237 B2
(45) Date of Patent: Jul. 19, 2022

(54) AIR BAG LID REINFORCING MEMBER AND METHOD FOR MANUFACTURING SAME

(71) Applicant: Marelli Corporation, Saitama (JP)

(72) Inventor: Yousuke Kobayashi, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 17/253,713

(22) PCT Filed: Jun. 20, 2019

(86) PCT No.: PCT/JP2019/024416
§ 371 (c)(1),
(2) Date: Dec. 18, 2020

(87) PCT Pub. No.: WO2019/244963
PCT Pub. Date: Dec. 26, 2019

(65) Prior Publication Data
US 2021/0261082 A1    Aug. 26, 2021

(30) Foreign Application Priority Data

Jun. 21, 2018   (JP) .............................. JP2018-118008

(51) Int. Cl.
*B60R 21/215*   (2011.01)
*B29C 45/00*    (2006.01)
(Continued)

(52) U.S. Cl.
CPC ........ *B60R 21/215* (2013.01); *B29C 45/0081* (2013.01); *B29C 45/14065* (2013.01);
(Continued)

(58) Field of Classification Search
CPC .......... B29C 45/0081; B29C 45/12065; B29C 45/14631; B29C 2045/14122;
(Continued)

(56) References Cited

U.S. PATENT DOCUMENTS 8,393,635 B2 *  3/2013  Laboeck ............. B60R 21/2165
                                                      280/728.3
8,403,357 B2 *  3/2013  Choi .................... B60R 21/215
                                                      280/728.2
(Continued)

FOREIGN PATENT DOCUMENTS

CN          201907477 U     7/2011
DE     10 2013 214 147 A1   1/2015
(Continued)

OTHER PUBLICATIONS

Extended European Search Report dated Feb. 8, 2021 for the corresponding European Application No. 19822646.6.

*Primary Examiner* — Paul N Dickson
*Assistant Examiner* — Tiffany L Webb
(74) *Attorney, Agent, or Firm* — Global IP Counselors, LLP

(57) ABSTRACT

An airbag lid reinforcing member includes a door part, a flange part, a leg part and a hinge member. The flange part surrounds an outer periphery of the door part. The leg part is arranged on the flange part. An inside surface of the leg part defines support ribs supporting the hinge member. The support ribs are arranged with a gap in a width direction of the leg part. A portion of the hinge member is buried in the flange part. In a region of the hinge member between a tip of each of the support ribs and an end surface of the flange part, at least an upper part in a thickness direction of the hinge member is exposed from the support ribs. A portion of the hinge member positioned between adjacent ones of the support ribs is exposed from the support ribs and the flange part.

5 Claims, 14 Drawing Sheets

(51) Int. Cl.
 *B29C 45/14* (2006.01)
 *B29L 31/30* (2006.01)
(52) U.S. Cl.
 CPC . *B29C 45/14631* (2013.01); *B29L 2031/3038* (2013.01); *B60R 2021/21537* (2013.01)
(58) Field of Classification Search
 CPC ..... B29L 2031/3038; B29L 2031/3055; B60R 21/205; B60R 21/20; B60R 21/215; B60R 2021/21537; B60R 21/2155
 See application file for complete search history.

(56) References Cited

U.S. PATENT DOCUMENTS

| | | | |
|---|---|---|---|
| 9,010,801 B2 * | 4/2015 | Baudart | B60R 21/205 |
| | | | 280/728.3 |
| 9,156,428 B2 * | 10/2015 | Edeline | B60K 37/00 |
| 10,604,099 B2 * | 3/2020 | Kim | B60R 21/205 |
| 2004/0075251 A1 | 4/2004 | Fujii et al. | |
| 2014/0203540 A1 | 7/2014 | Edeline | |
| 2014/0375026 A1 | 12/2014 | Schupbach | |
| 2016/0167612 A1 | 6/2016 | Svensson et al. | |

FOREIGN PATENT DOCUMENTS

| | | |
|---|---|---|
| FR | 3015393 A1 | 6/2015 |
| FR | 3058966 A1 | 5/2018 |
| JP | 2002-087197 A | 3/2002 |
| JP | 2004-255900 A | 9/2004 |
| JP | 2007-062701 A | 3/2007 |
| JP | 2007-290409 A | 11/2007 |
| JP | 2018-024267 A | 2/2018 |
| JP | 2018-024296 A | 2/2018 |

\* cited by examiner

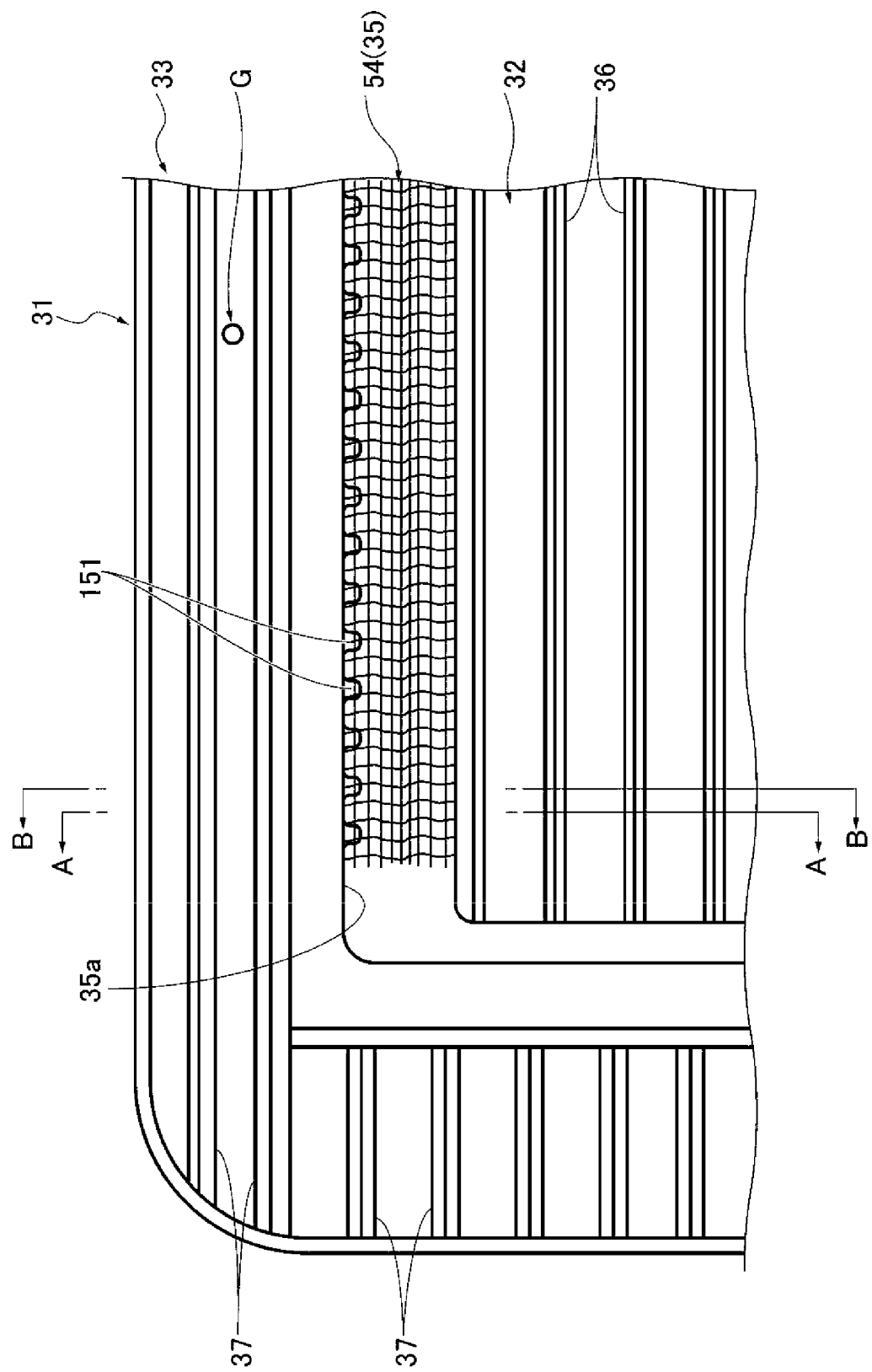

AIR BAG LID REINFORCING MEMBER AND METHOD FOR MANUFACTURING SAME

CROSS-REFERENCE TO RELATED APPLICATION

This is a U.S. national phase application of PCT/JP2019/024416, filed on Jun. 20, 2019, which claims priority to Japanese Patent Application 2018-118008 filed in Japan on Jun. 21, 2018. The entire disclosure of Japanese Patent Application 2018-118008 is incorporated herein by reference.

TECHNICAL FIELD

The present case relates to an airbag lid reinforcing member and the manufacturing method therefor.

BACKGROUND ART

In vehicles such as automobiles, an airbag device is provided as a safety measure for emergencies (e.g. see Japanese Laid Open Patent Publication No. 2007-62701, French Patent Publication No. FR3015393).

In Japanese Laid Open Patent Publication No. 2007-62701, a door part (first backing plate) and a flange part (second backing plate) are connected by a mesh hinge member (easy bending material). With this kind of hinge member, when the airbag is deployed, it is assumed that the boundary part of the hinge member and the flange part (specifically, the root part that protrudes from the flange part in the hinge member) is a fulcrum for rotation.

In French Patent Publication No. FR3015393 as well, a flange part (part indicated by 18 in the document), and a door part (parts indicated by code numbers 34, 42 in the document) are connected by a hinge connecting member (part indicated by code number 36 in the document).

SUMMARY

The inventor of the present application discovered that there are the following problems for the inventions of Japanese Laid Open Patent Publication No. 2007-62701 and French Patent Publication No. FR3015393 described above. Specifically, with the invention of Japanese Laid Open Patent Publication No. 2007-62701, there is a risk that the cloth of the airbag inflated toward the door during deployment of the airbag will directly touch the boundary part of the hinge member and the flange part. In that case, shearing force is applied to the part that becomes the fulcrum for rotation in the hinge member.

In contrast, with French Patent Publication No. FR3015393, as shown in FIG. 4b of the document, a step part is formed by the end surface of the flange part and the top surface of the leg part, and the hinge member is exposed from the flange part at the top surface of the leg part. If the structure of this French Patent Publication No. FR3015393 is faithfully realized, the fulcrum for rotation of the hinge member is positioned further to the outside than the inner surface of the leg part, and is protected from the cloth of the airbag.

However, with the invention noted in the above-mentioned French Patent Publication No. FR3015393, in the hinge member, there is a risk that a resin layer will be formed on the entire top side of the part exposed from the flange part on the leg part.

Specifically, with the configuration of French Patent Publication No. FR3015393 noted above, when doing insertion molding of the hinge member in the flange part and the leg part, within the mold, the part that becomes the fulcrum for rotation in the hinge member is positioned on the molding space that forms the leg part. However, that molding space does not support the hinge member. For this reason, there is a risk that when injecting resin, the hinge member will bend due to injection pressure, the leg part will be molded in a state with the hinge member entered into the molding space, and the hinge member will end up creeping into the leg part. As a result, in the hinge member, the location that is exposed from the resin and becomes the fulcrum for rotation ends up moving to the inner surface side of the leg part. When that happens, ultimately this is the same as with the configuration of Japanese Laid Open Patent Publication No. 2007-62701, with the cloth of the airbag directly touching the fulcrum for rotation, and the problem relating to shearing stress on the hinge member accompanying deployment of the airbag occurring.

In light of this, the main purpose of the present case is to address the problems noted above.

To address the problems noted above, the present case is an airbag lid reinforcing member comprising: a door part that can open and close, a flange part made of resin that surrounds the outer periphery of the door part, a leg part made of resin installed on the lower side of the flange part, and a hinge member that is configured by at least a member separate from the flange part, and that connects the flange part and the door part to be able to open and close, wherein on the inside surface of the leg part, a plurality of support ribs that support the hinge member from the lower surface side are provided having a gap in the width direction of the leg part, a portion of the hinge member is buried in the flange part, in the portion of the hinge member on the support rib, in the range from the tip of the support rib to the end surface of the flange part, at least the upper part in the thickness direction of the hinge member is exposed from the support rib, and the portion of the hinge member positioned between support ribs is exposed from the support rib and the flange part.

BRIEF DESCRIPTION OF THE DRAWINGS

FIG. 2A is a partial plan view of an airbag lid reinforcing member of FIG. 1.

DETAILED DESCRIPTION OF EMBODIMENTS

Hereafter, the present embodiment is explained in detail using the drawings.

FIG. 1 to FIG. 11 are for explaining this embodiment.

Embodiment 1

Configuration

Hereafter, the configuration of this embodiment is explained.

Figure 1:
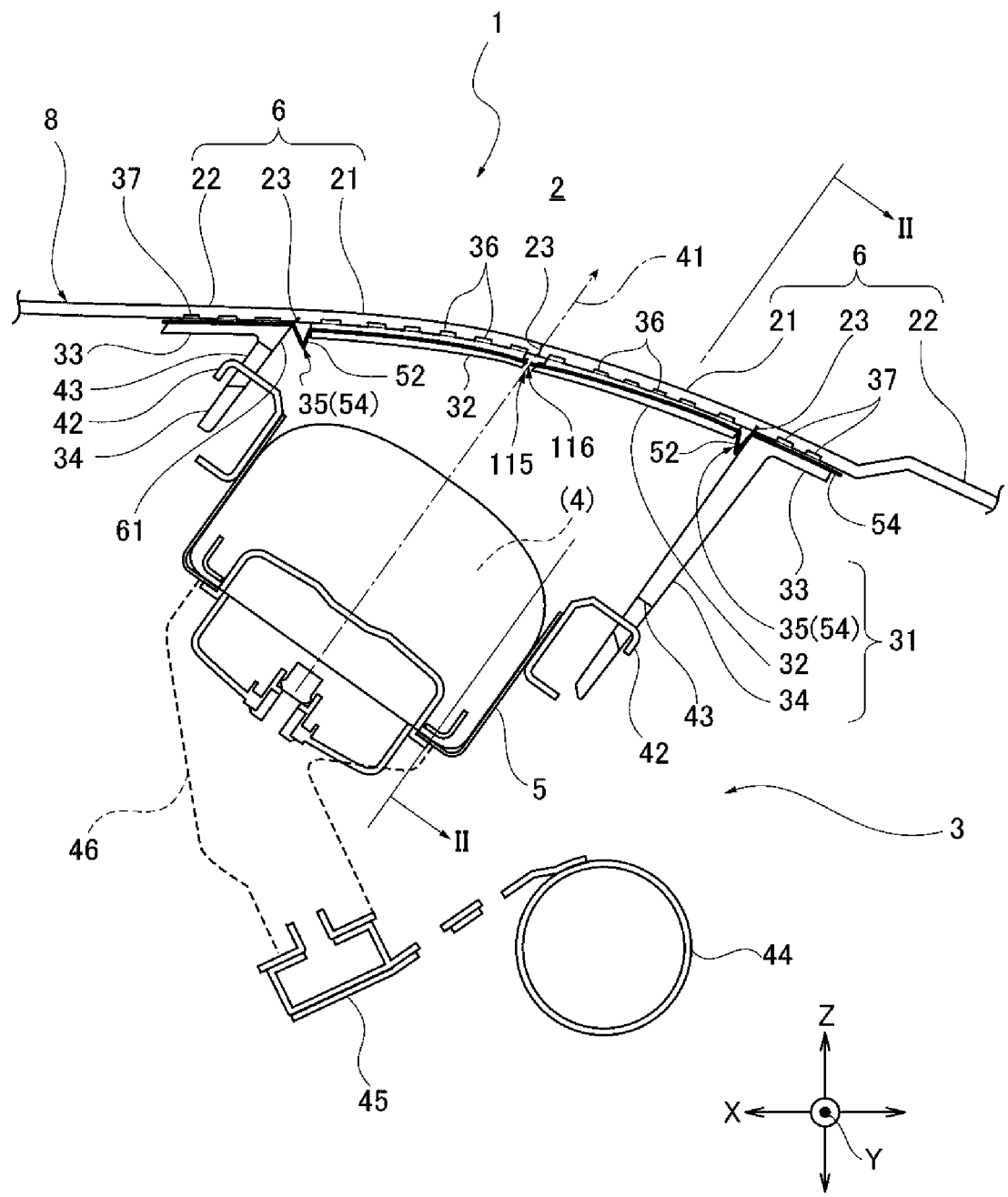
FIG. 1 is a vertical cross section diagram of an airbag device of the present embodiment.

FIG. 1 shows an airbag device. The directions in the drawing are vehicle front-rear direction X, vehicle width direction Y, and vertical direction Z.

In a vehicle 1 such as an automobile, an airbag device 3 is provided inside a passenger compartment 2 as a safety measure for emergencies. For example, the airbag device 3 for the passenger seat comprises an airbag module 5 that houses a folded bag-shaped airbag body 4, a lid member 6, and an airbag lid reinforcing member 31.

During deployment, the airbag body 4 expands from an opening part formed on the top surface side of the airbag module 5 diagonally upward and backward facing the occupant side. In FIG. 1, the expansion direction of the airbag body 4 is noted as code number 41. In this way, to expand the airbag body 4, the airbag module 5 is placed tilted with respect to the surface of the lid member 6 facing in approximately the vertical direction Z in a state with the opening part of the top surface of the airbag module 5 facing the occupant side.

The lid member 6 conceals the airbag module 5 from above at normal times, and also forms an opening 61 by which the airbag body 4 deployed from the airbag module 5 is expanded toward inside the passenger compartment 2 during an emergency. The lid member 6 has a lid section 21 that is opened by the airbag body 4, and a lid outer periphery part 22 that surrounds the outer periphery of the lid section 21.

With this embodiment, two lid sections 21 are provided in a vehicle front-rear direction X (first lid section (vehicle front side) and second lid section (vehicle rear side)). The lid section 21 and the lid outer periphery part 22 are defined by a cleavage line 23. The cleavage line 23 is a notch formed on the rear surface side of the lid member 6, at a depth that does not reach the surface of the lid member 6. The lid member 6 includes items that are integrated with an instrument panel 8, and items that are separate from the instrument panel 8. Generally, the instrument panel 8 has a top surface part positioned under a front window and facing approximately the vertical direction Z, and a front side surface part that extends approximately downward from the edge part of the occupant side of the top surface part, and the lid member 6 is provided at the position of the top surface part.

The airbag lid reinforcing member 31 is attached to the rear surface side of the lid member 6 to reinforce the lid member 6, houses at least a portion of the airbag module 5, and guides the airbag body 4 deployed from the airbag module 5 to the lid member 6.

The airbag lid reinforcing member 31 has a door part 32, a flange part 33, a leg part 34, and a hinge part 35. Among these, two door parts 32 are provided in the vehicle front-rear direction X (first door part (vehicle front side) and second door part (vehicle rear side)), these are attached to the rear surface of each lid section 21 to reinforce each lid section 21, and integrated with the lid section 21 to be able to open and close.

The flange part 33 surrounds the outer periphery of the door part 32 with a gap in the circumferential direction, and is attached to the rear surface of the lid outer periphery part 22 to reinforce the lid outer periphery part 22. Welding ribs 36, 37 for welding to the lid member 6 are provided on the front surface of the door part 32 and the flange part 33.

The leg part 34 is installed below the door part 32 and the flange part 33 in a state surrounding the upper part of the airbag module 5. In the leg part 34, the upper part of the airbag module 5 is made to be inserted from below, and the leg part 34 functions as a guide part for guiding the deployed airbag body 4 toward the door part 32 and the lid section 21. For that reason, the leg part 34 is in an approximate frame shape surrounding the position of the outside of the door part 32 or the outer periphery side of the door part 32 and extending in the expansion direction 41 (see FIG. 1) to inside the passenger compartment 2.

With the present embodiment, as described above, the configuration is such that the airbag module 5 is placed tilted in a state facing the occupant side, and in the opening 61 of the lid member 6, the expansion direction 41 of the airbag body 4 is tilted (at least it is not orthogonal) with respect to the virtual straight line connecting the end part of the vehicle front side and the end part of the vehicle rear side. As a result, when the leg part 34 is seen from the side, the occupant side (rear side) is longer than the front window side (front side). Specifically, the distance from the airbag module 5 to the occupant side hinge part 35 is longer than the distance from the airbag module 5 to the front window side (front side) hinge part 35.

Also, a hook part 42 is provided on the front and back side surfaces of the upper part of the airbag module 5, and a locking hole 43 that can be loosely fitted with the hook part 42 is formed on the leg part 34. Attachment between the upper part of the airbag module 5 and the leg part 34 is not limited to the hook part 42, and can be done by fixing with a bolt, etc., for example. Also, the lower part of the airbag module 5 is fixed using brackets 45, 46 to a vehicle body strength member 44 such as a steering support member provided in the vehicle body.

The hinge part 35 connects the door part 32 to the flange part 33 to be able to open and close. With this embodiment, the hinge part 35 has a vehicle front hinge part that connects the first door part and the flange part 33, and a vehicle rear hinge part that connects the second door part and the flange part 33. The hinge part 35 has an extra length part 52 that becomes the rotation center of the door part 32. The extra length part 52 is placed at a position between the door part 32 and the leg part 34 so as to detour downward. The extra length part 52 is approximately a U shape or approximately a V shape in the side view. The hinge part 35 is configured by a hinge member 54 that is formed by a separate member. For the hinge member 54, it is possible to use a flexible net or film made of resin, or mesh made of metal, etc. With this embodiment, a net made of resin is used for the hinge member 54. With the hinge member 54, using insert molding, in a state with the extra length part 52 or its peripheral part exposed in the gap between the door part 32 and the leg part 34 and the flange part 33, both side parts of the extra length part 52 are buried in the interior of the door part 32 and the flange part 33 or the leg part 34.

For the basic configuration as noted above, with this embodiment, the following kind of configuration is used.

Airbag Lid Reinforcing Member 31

The airbag lid reinforcing member 31 of this embodiment has: the door part 32 that can open and close; the flange part 33 that surrounds the outer periphery of the door part 32; the leg part 34 installed below the flange part 33; and the hinge part 35 that connects the door part 32 to the flange part 33 to be able to open and close.

Here, the hinge part 35 is constituted by a separate hinge member 54. In the hinge member 54, the boundary part with the flange part 33 (or the leg part 34) at the opening 61 side is called a root part 35*a*. This root part 35*a* is the fulcrum for rotation of the hinge member 54 when the door part 32 opens.

Figure 2:
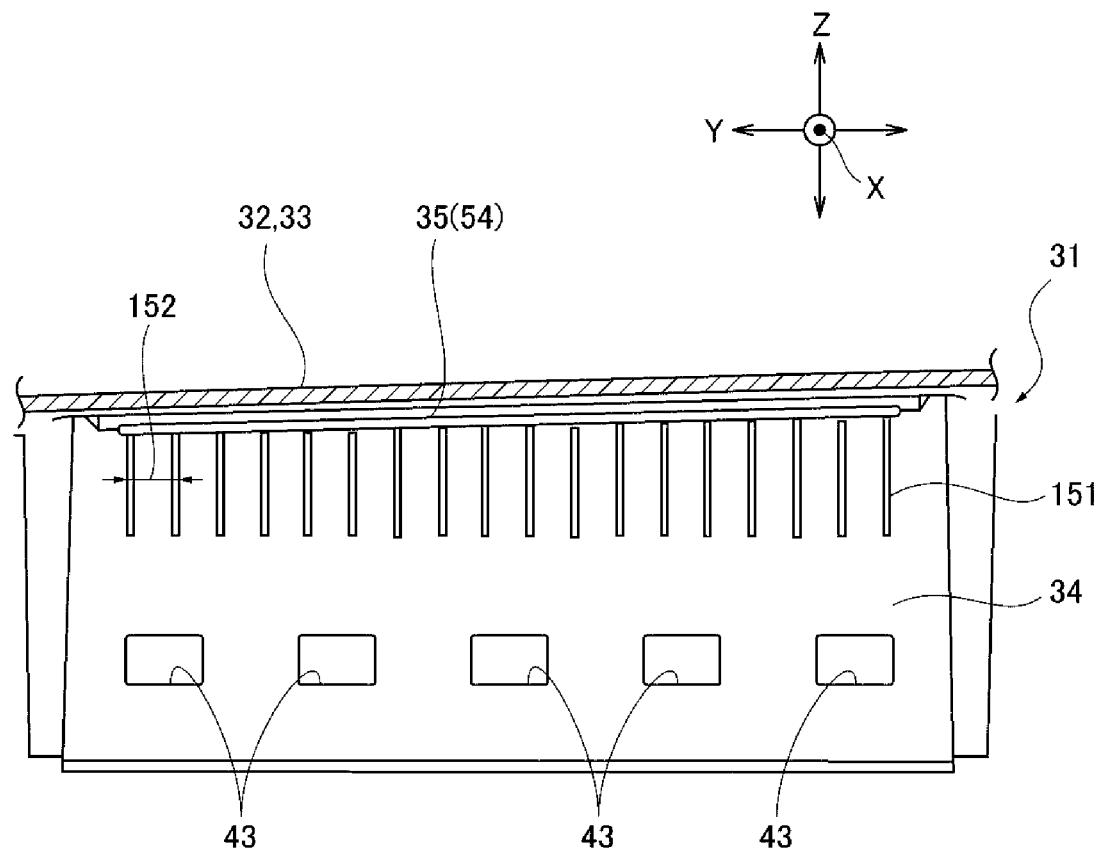
FIG. 2 is a cross section diagram viewing a leg part from the position of line II-II of FIG. 1.
Figure 2B:
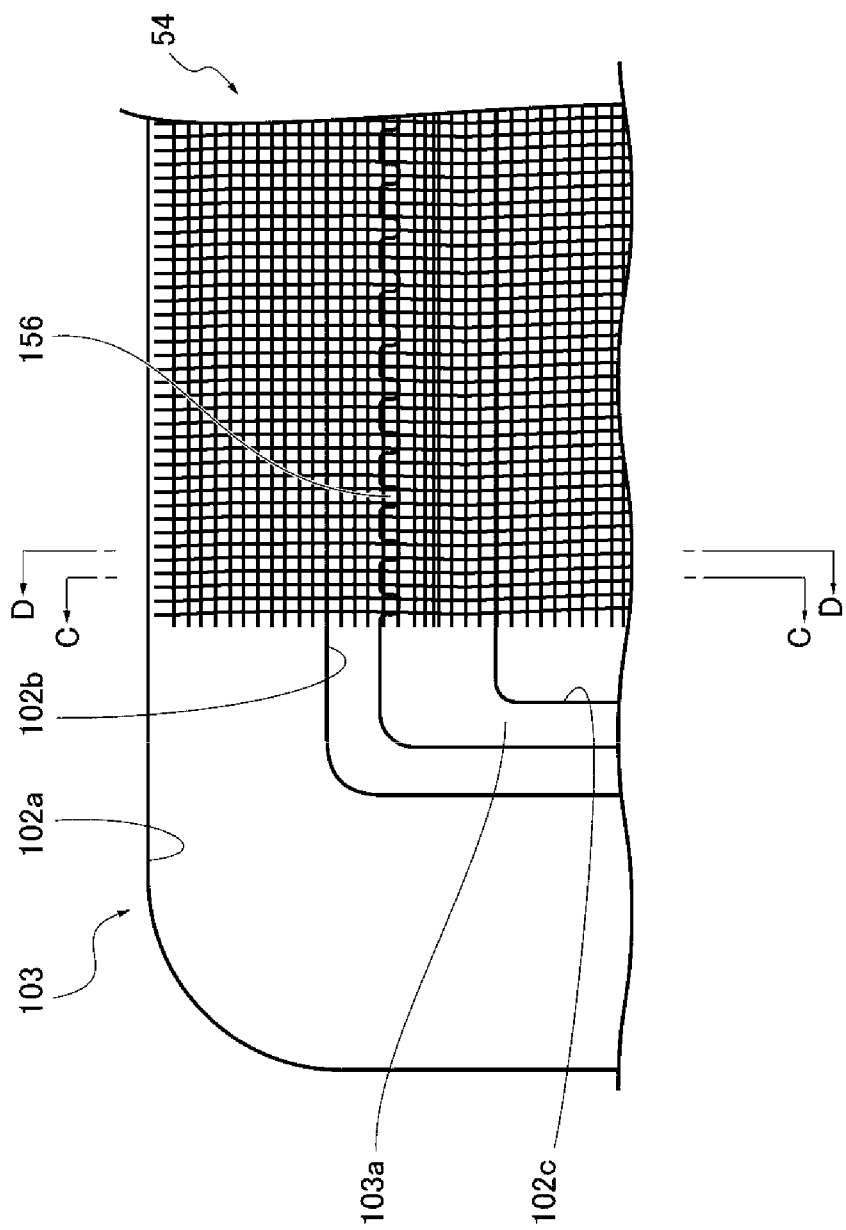
FIG. 2B is a partial plan view of the lower mold of a mold device for manufacturing.
Figure 3:
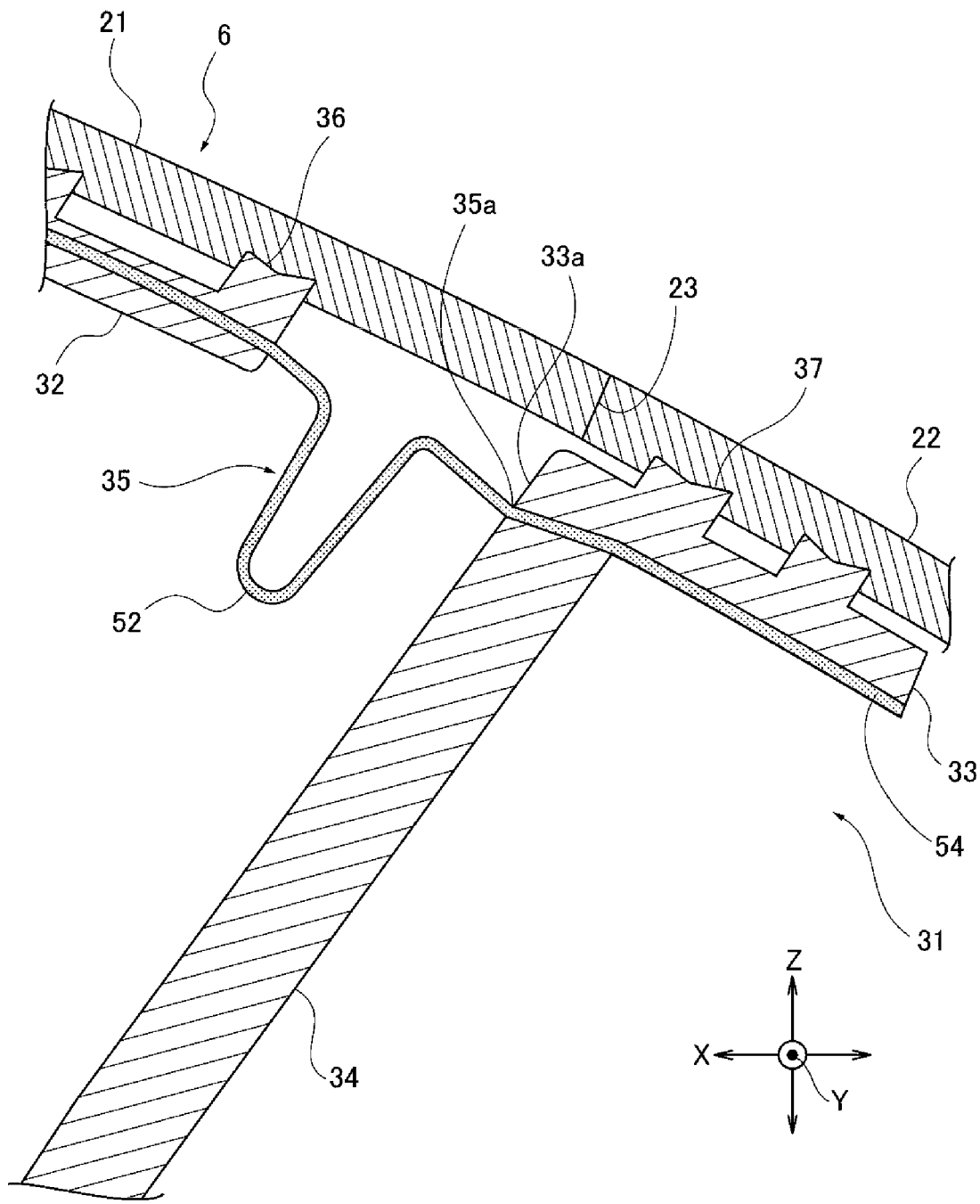
FIG. 3 is an enlarged view of a part without support ribs in FIG. 1, and a cross section diagram of line A-A in FIG. 2A.
Figure 4:
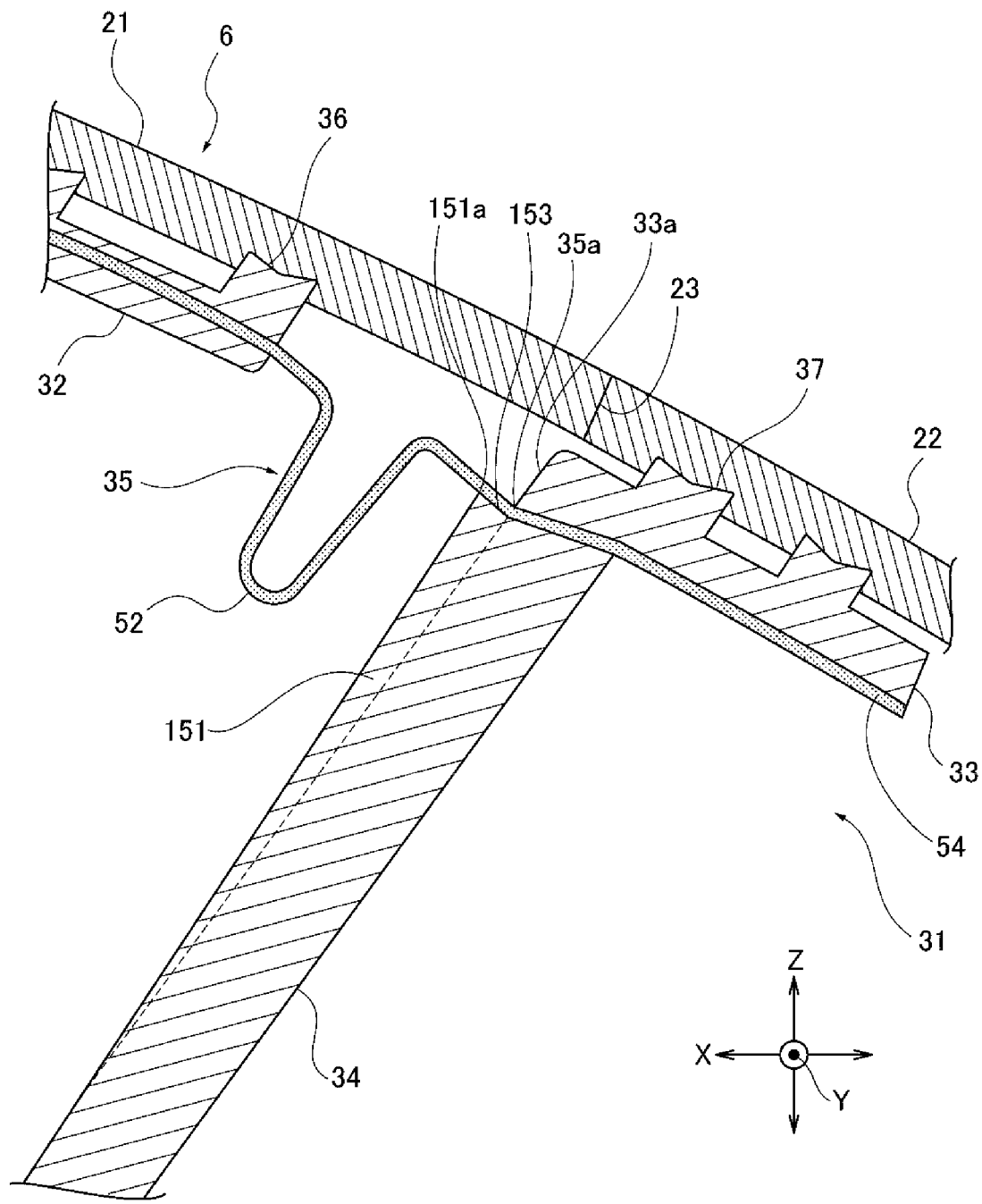
FIG. 4 is an enlarged view of a part having support ribs in FIG. 1, and is a cross section diagram of line B-B in FIG. 2A.

(1) As shown in FIG. 2, support ribs 151 are provided on the inside surface of the leg part 34 to support the hinge part 35 from the lower surface side (see cross section of the part without ribs in FIG. 2A, FIG. 2B, and FIG. 3, and the part with ribs in FIG. 4). In FIG. 2, the illustration omits the hook part 42 of the airbag module 5.

A plurality of the support ribs 151 are provided in the width direction of the leg part 34 (vehicle width direction Y) having gaps 152.

Here, the support ribs 151 are inner ribs along the inside surface of the leg part 34. In FIG. 4, the support ribs 151 receive the leg part 34 side part more than the extra length part 52 in the hinge member 54. For that reason, they are narrow ribs that do not reach the extra length part 52.

There is a risk that if the number of support ribs 151 is small, there may be a burden on the airbag body 4, so a larger number of the support ribs 151 are provided to a level at which there will not be a burden on the airbag body 4. Also, when the gaps 152 between the support ribs 151 are too large, the airbag body 4 enters between those support ribs 151, and contacts the root part 35*a* that is the fulcrum for rotation of the hinge member 54, so the number is set as appropriate from this perspective as well. On the other hand, the mold may enter the space between the support ribs 151 during molding, so the minimum required dimensions of the gaps 152 depends on the strength of the mold. In FIG. 2, the support ribs 151 are provided in a number of approximately 3 times or greater than that of the locking holes 43 provided in the leg part 34. However, the number of support ribs 151 and the gaps 152 are not limited to what is noted above.

Figure 12:
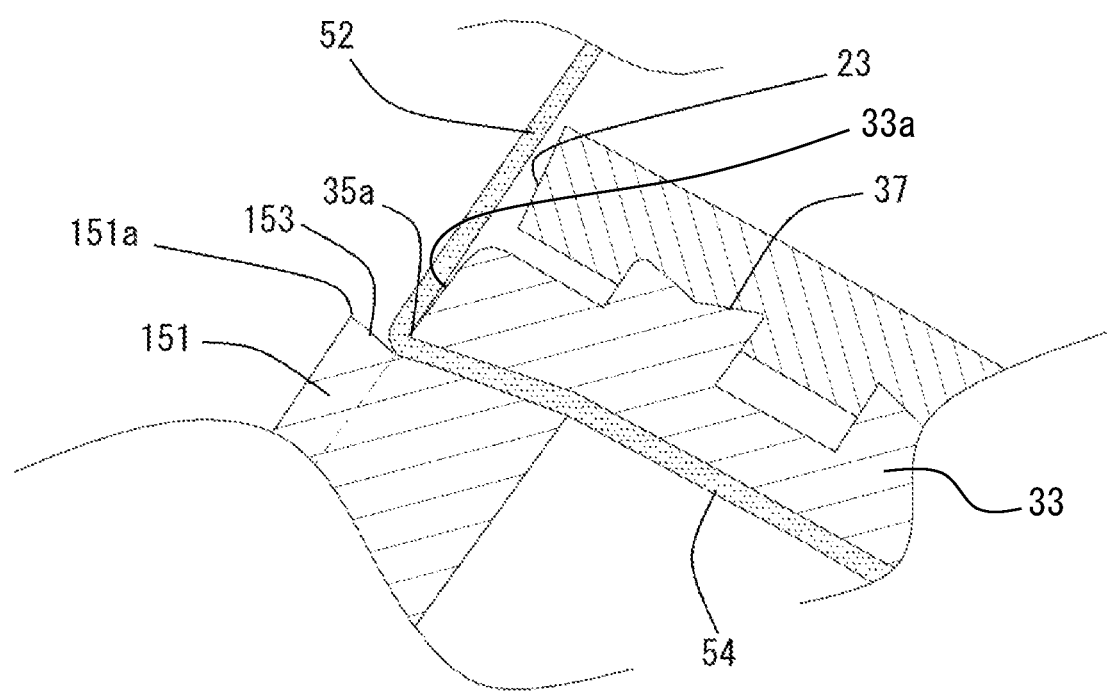
FIG. 12 is an enlarged partial cross sectional diagram corresponding to FIG. 4 illustrating a state in which the air bag body has been deployed.

Hereafter, the upper edge part of the support ribs 151 is called a support part 153. In the case of a separate hinge, the lower part in the thickness direction of the hinge part 35 (hinge member 54) is buried in the support part 153. The upper part in the thickness direction of the hinge part 35 is exposed, without being buried in the support part 153. Also, as shown in FIG. 12, during deployment of the airbag body 4, by opening of the lid section 21, the lower part in the thickness direction of the hinge part 35 (hinge member 54) is peeled from the support part 153, and the boundary part with an end surface 33*a* of the flange part 33 (or the inner surface of the leg part 34) in the hinge member 54 becomes the fulcrum for rotation, and the door part 32 opens. At this time, the hinge part 35 is deformed according to the opening of the lid section 21, and the support ribs 151 remain in place without deforming.

Figure 5:
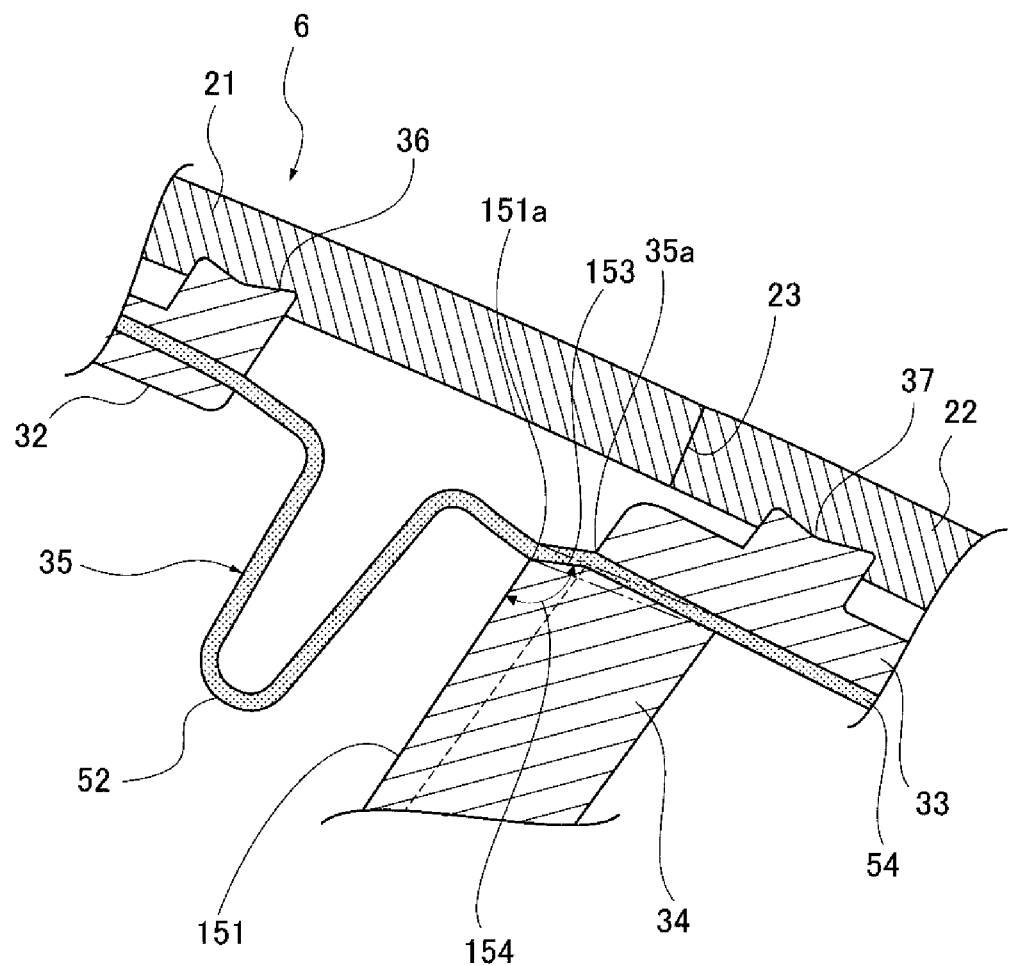
FIG. 5 is a partial enlarged view of a modification example of FIG. 4.

(2) As shown in the modification example of FIG. 5, the support part 153 may also be an obtuse angle 154.

The obtuse angle 154 is an angle formed by the inside surface and the upper edge part (support part 153) of the support rib 151. In FIG. 5, by using the obtuse angle 154 for the support part 153, burying inside the leg part 34 is done such that the part supported by the support part 153 of the hinge member 54 becomes an ascending slope facing the flange part 33, and the part inside the leg part 34 of the hinge member 54 becomes a gentle descending slope facing (the position of the lower surface of) the flange part 33.

The angle formed by the support part 153 and the inside surface of the support rib 151 can be made into a right angle, or can be made into an acute angle as shown in FIG. 4. In FIG. 4, by using an acute angle for the support part 153, burying inside the leg part 34 is done such that the part supported by the support part 153 of the hinge member 54 becomes a descending slope facing the flange part 33, and the part inside the leg part 34 of the hinge member 54 becomes a gentle ascending slope facing (the position of the lower surface of) the flange part 33.

Figure 6:
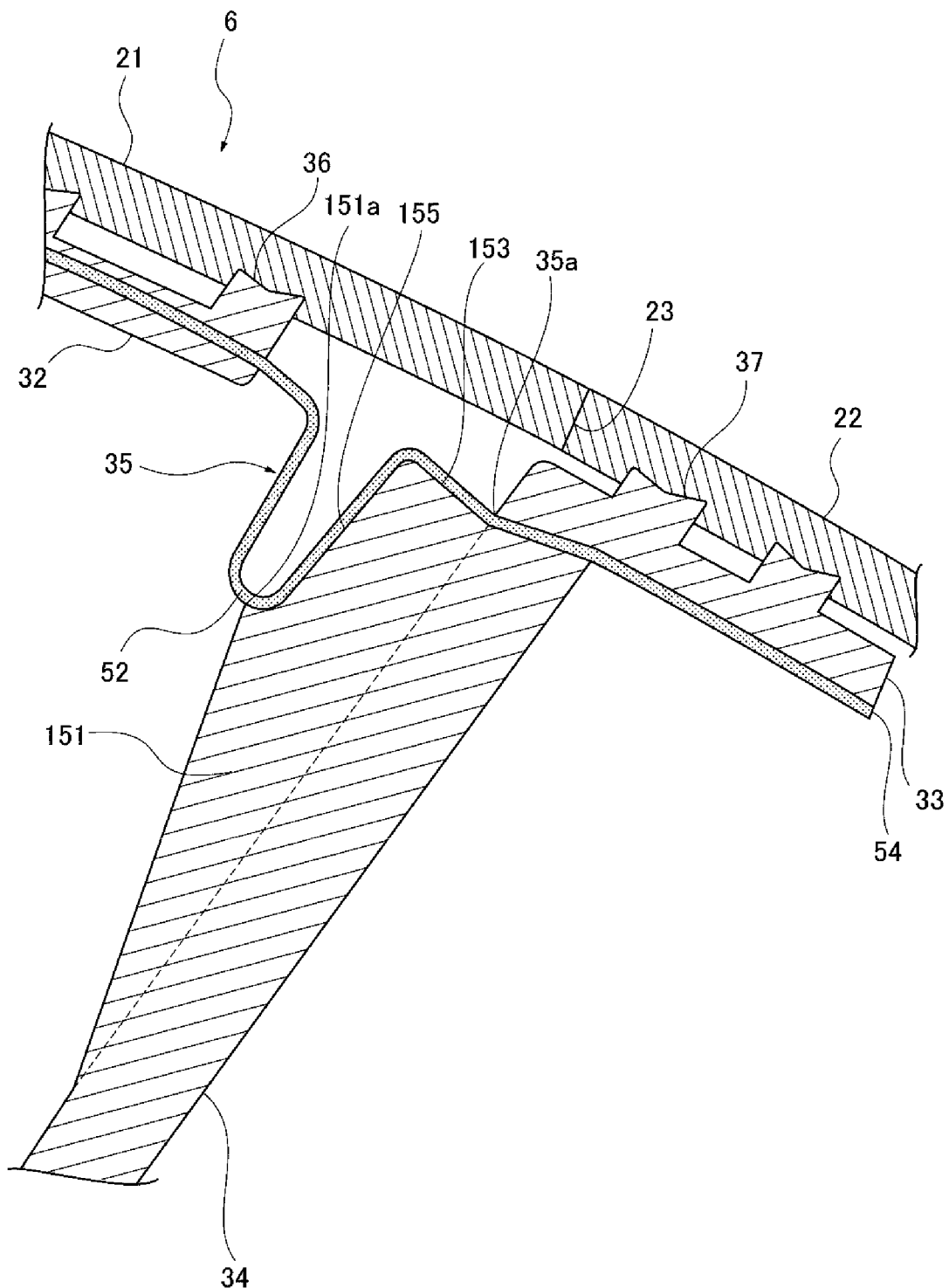
FIG. 6 is a partial enlarged view of another modification example of FIG. 4.

(3) As shown in another modification example in FIG. 6, the hinge part 35 has the extra length part 52 detour downward between the door part 32 and the leg part 34. The support rib 151 may also have an extra length support part 155 that supports the side surface of the leg part 34 side of the extra length part 52.

Here, the extra length support part 155 is formed as a part of the support part 153 at the door part 32 side of the upper edge part (support part 153) of the support rib 151. The extra length support part 155 is a notch of a shape that supports approximately half (half of the side surface and bottom part) of the leg part 34 side of the extra length part 52. For that reason, the support rib 151 is a wide rib that reaches the position of the bottom part of the extra length part 52.

Mold Device for Manufacturing 101 of Airbag Lid Reinforcing Member 31

Figure 7:
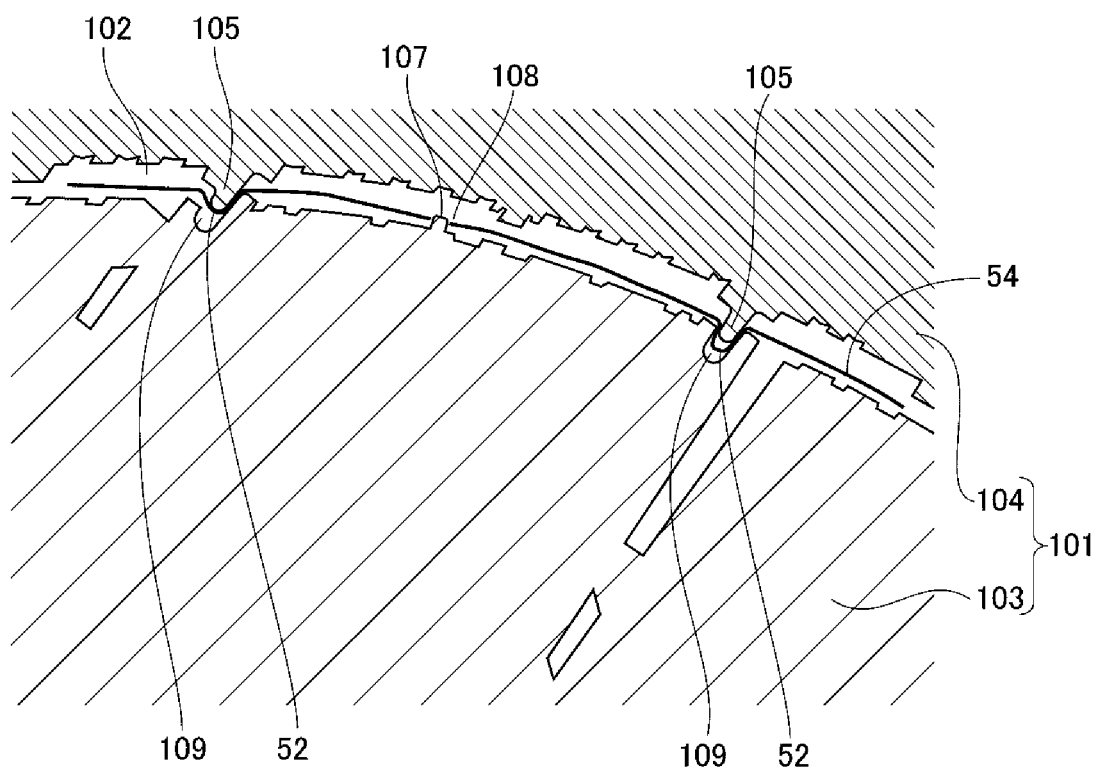
FIG. 7 is a vertical cross section diagram of a mold device for manufacturing the airbag lid reinforcing member.
Figure 8:
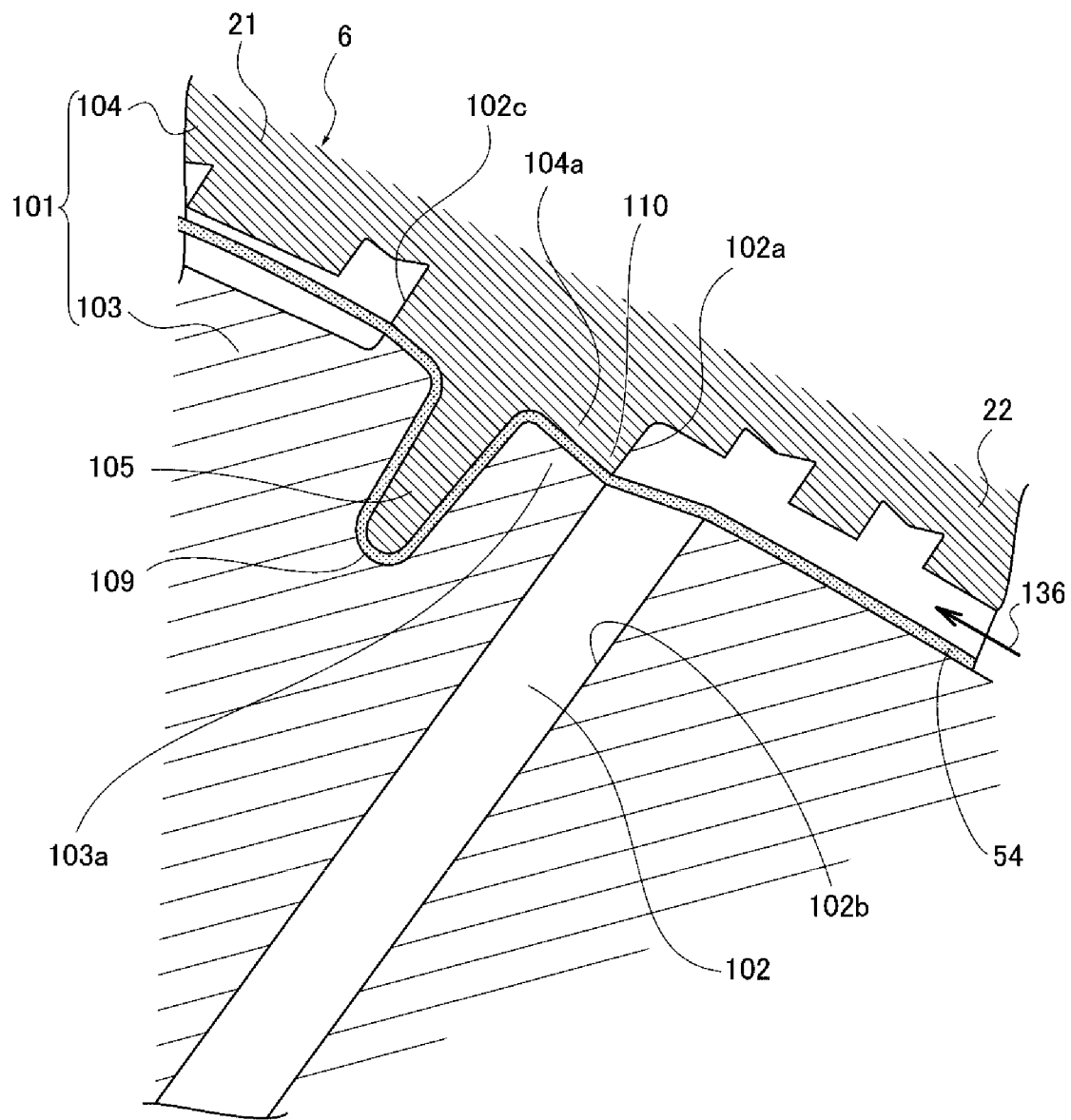
FIG. 8 is a cross section diagram along line C-C in FIG. 2B corresponding to the upper peripheral part (part without support ribs) of the leg part of the mold device for manufacturing in FIG. 7.

A mold device for manufacturing 101 of the airbag lid reinforcing member 31 is an item like that shown in FIG. 7. The mold device for manufacturing 101 has a molding space 102 for molding the airbag lid reinforcing member 31 like that shown in FIG. 1 that has the door part 32 that can open and close; the flange part 33 that surrounds the outer periphery of the door part 32; the leg part 34 installed below the flange part 33; and the hinge part 35 that connects the door part 32 to the flange part 33 to be able to open and close. The molding space 102 is formed on the inside of upper and lower molds 104, 103 (upper mold, lower mold). In FIG. 2B and FIG. 8, a molding space 102*a* molds the flange part 33, a molding space 102*b* molds the leg part 34, and a molding space 102*c* molds the door part 32. Also, in the mold 103, the location that clamps the hinge member 54 between the molding space 102*a* and the molding space 102*c* is illustrated as a hinge member clamping unit 103*a*.

Figure 9:
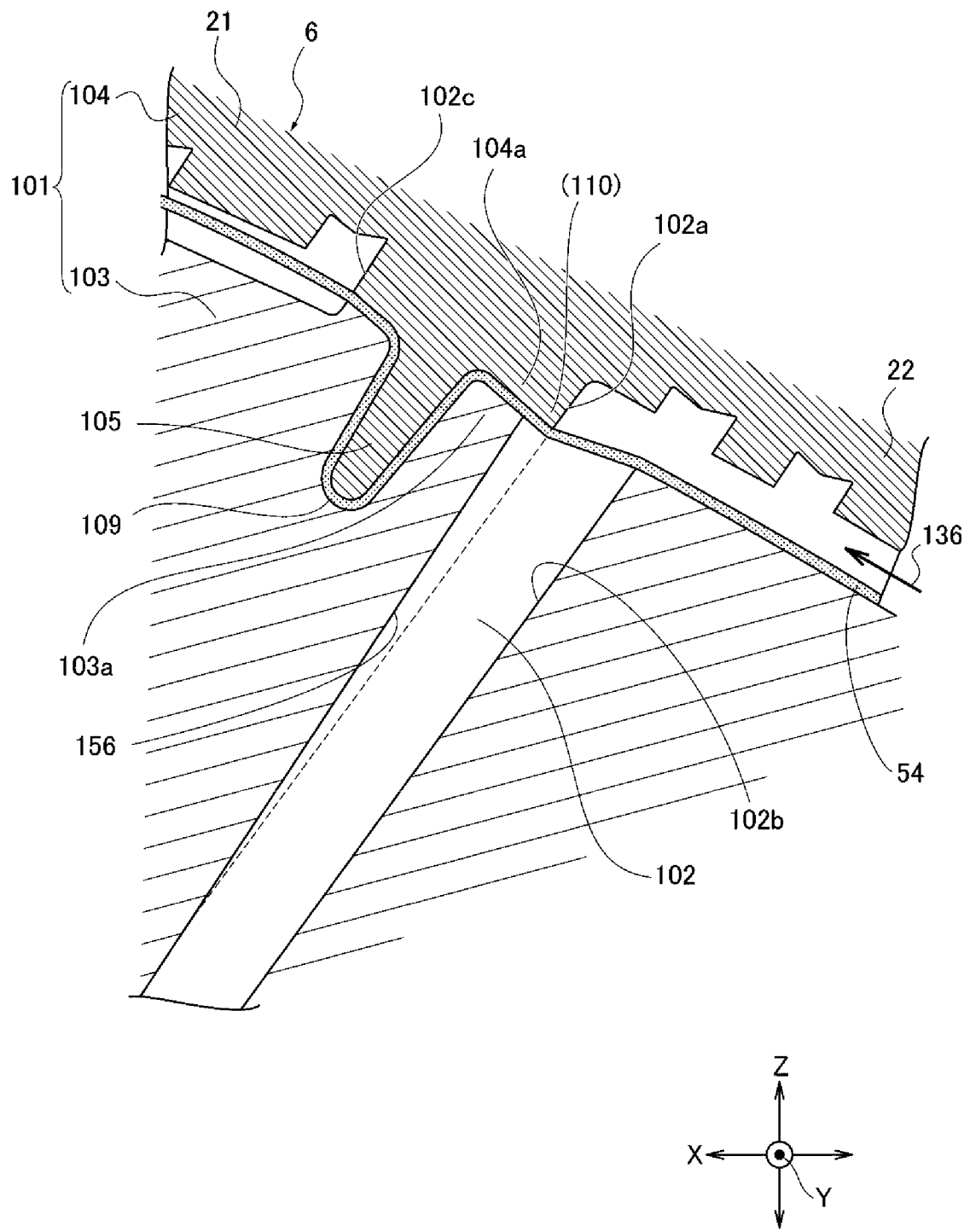
FIG. 9 is a cross section diagram along line D-D in FIG. 2B corresponding to the upper peripheral part (part with support ribs) of the leg part of the mold device for manufacturing in FIG. 7.

Also, as shown in FIG. 9 (also see FIG. 2B), a recess for forming a support rib 156 that molds the support rib 151 is formed having the gap 152 so as to be indented facing the hinge member clamping unit 103a from the molding space 102.

Figure 10:
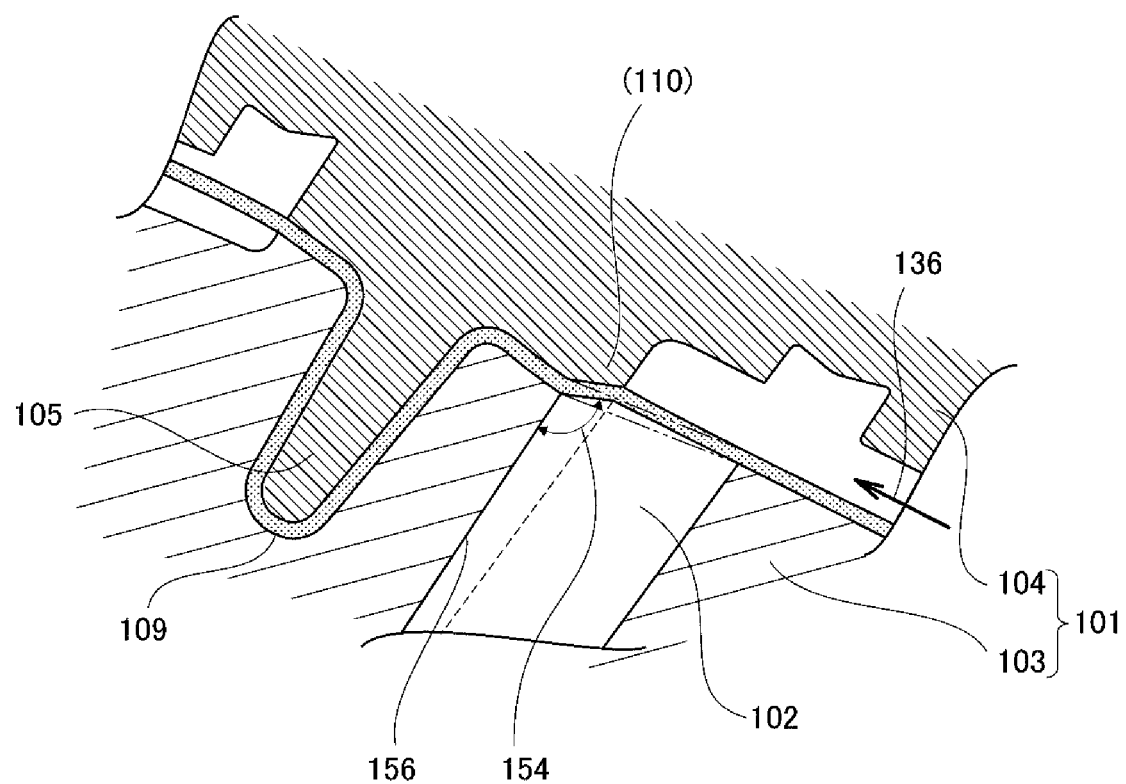
FIG. 10 is a partial enlarged view of the same kind of mold device for manufacturing as in FIG. 8 for a modification example in FIG. 4.
Figure 11:
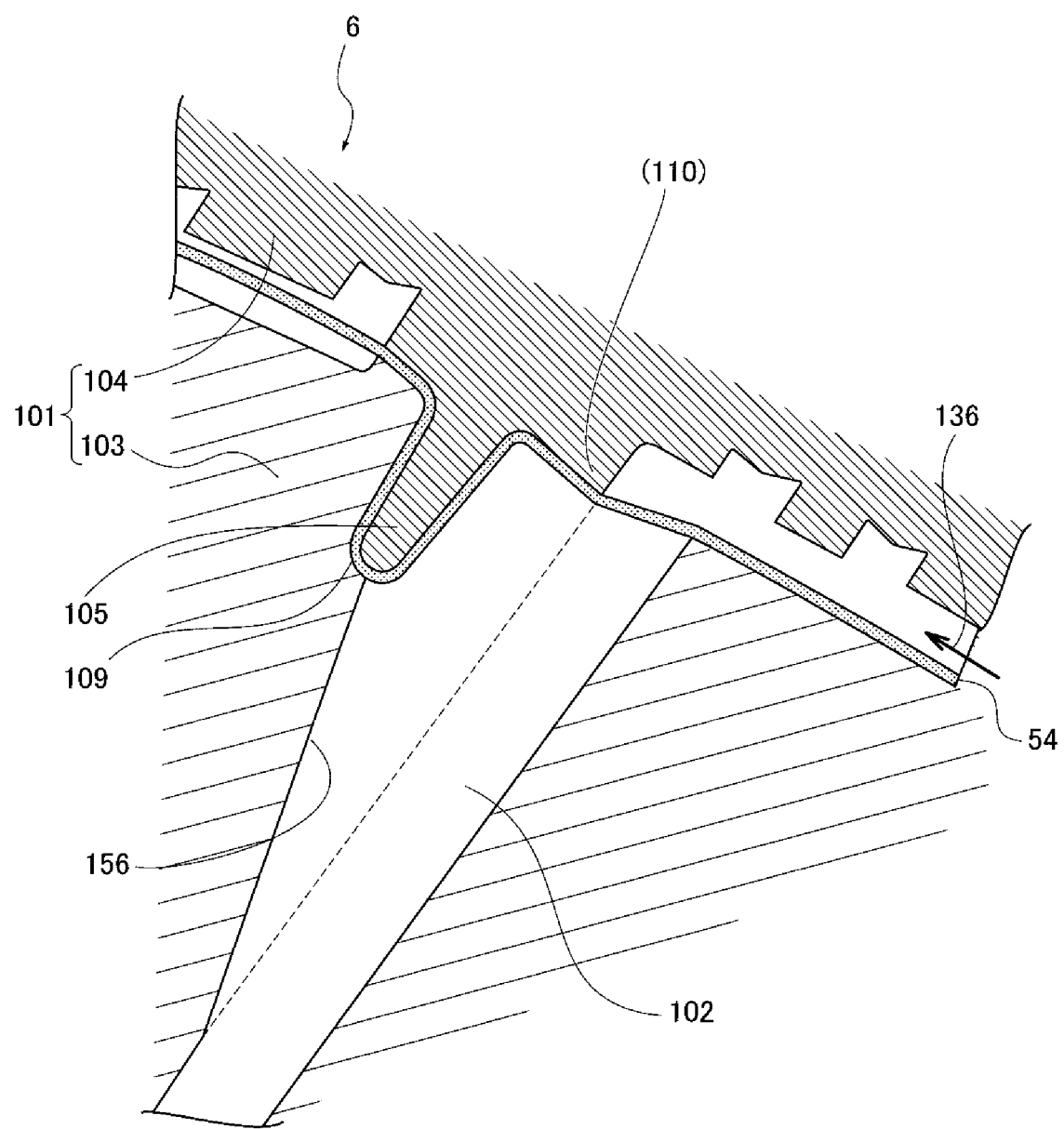
FIG. 11 is a partial enlarged view of the same kind of mold device for manufacturing as in FIG. 8 for another modification example in FIG. 5.

As shown in FIG. 10 (also see FIG. 5), the recess for forming a support rib 156 may also be an item that forms the support part 153 in the obtuse angle 154. As shown in FIG. 11 (also see FIG. 6), the recess for forming a support rib 156 may also be an item that forms the extra length support part 155.

In addition to the above, provided in the molds 103, 104 are a projection for forming an extra length part 105 for forming the extra length part 52 of the hinge part 35, and a recess for forming an extra length part 109 (extra length forming part). Also, on the inside of the molds 103, 104, a locate-pin 107 that is inserted in a locate-hole 108 provided on the hinge member 54 for positioning the hinge member 54 is provided as appropriate.

Also, as shown in FIG. 8, formed in the mold 104 is a hinge member clamping unit 104a that grips the hinge member 54 above and below between itself and the hinge member clamping unit 103a of the mold 103. The hinge member clamping unit 103a of the mold 103 and the hinge member clamping unit 104a of the mold 104 are collectively referred to as a clamping unit 110. By being formed connected also to the top side of the recess for forming a support rib 156, the shape of the hinge member clamping unit 104a of the upper mold 104 forms the upper edge part (support part 153) of the support rib 151, and also, the lower part in the thickness direction of the hinge part 35 (hinge member 54) is buried in the support part 153, and is used to expose the upper part in the thickness direction of the hinge part 35.

Method for Manufacturing the Airbag Lid Reinforcing Member 31

The method for manufacturing the airbag lid reinforcing member 31 manufactures the airbag lid reinforcing member 31 having: the door part 32 that can open and close; the flange part 33 that surrounds the outer periphery of the door part 32; the leg part 34 that is installed below the flange part 33; and the hinge part 35 that connects the door part 32 to the flange part 33 to be able to open and close. Also, a plurality of support ribs 151 that support the hinge part 35 from the lower surface side having gaps 152 in the width direction of the leg part 34 are formed on the inside surface of the leg part 34.

Here, the airbag lid reinforcing member 31 is manufactured by performing: a step for setting the hinge member 54 on the interior of the opened molds 103, 104 (setting step); a step for doing mold clamping of molds 103, 104 (mold clamping step); an injection molding step for injecting a molten resin 136 (FIG. 8) inside the molding space 102 (from a gate G (FIG. 2A); and a mold removal step for doing mold removal of the airbag lid reinforcing member 31 from the molds 103, 104 after the molten resin 136 inside the molding space 102 has hardened to a certain degree.

During the setting step, the hinge member 54 is set on the lower mold 103.

At this time, the part positioned on the recess for forming a support rib 156 of the hinge member 54 has the upper part supported by the mold 104, while the lower part is exposed in the space of the recess for forming a support rib 156. However, at both sides of this recess for forming a support rib 156 (vehicle width direction Y), the hinge member 54 is in a fixed state by the clamping unit 110. Similarly, the part that protrudes from the leg part 34 (flange part 33) of the hinge member 54 to the door part 32 side (inside) is also gripped and fixed above and below by the clamping unit 110 of the molds 103, 104 (FIG. 8), so it cannot move.

Also, the part inside the flange part 33 of the hinge member 54 is in a state for which movement is difficult by restraining as appropriate using the locate-pin 107, etc., in a state set on the lower mold 103.

With the injection molding step, the molten resin 136 is injected inside the molding space 102. This makes it possible to obtain the airbag lid reinforcing member 31 having the support ribs 151. At this time, the hinge member 54 positioned on the recess for forming a support rib 156 as noted above is fixed at both sides of the recess for forming a support rib 156 (vehicle width direction Y), so the hinge member 54 creeping into the recess for forming a support rib 156 due to injection pressure is suppressed. The support ribs 151 can also have the support part 153 formed at the obtuse angle 154, or have the extra length support part 155 provided.

Action

Following, the action of this embodiment is explained.

When the airbag body 4 is deployed and the airbag module 5 comes out during an emergency, the airbag body 4 is guided to follow the leg part 34 while it inflates, and presses the door part 32 and the lid section 21 from below. By this pressing force of the airbag body 4, the cleavage line 23 is cleaved, the door part 32 and the lid section 21 are opened with the hinge part 35 as the center, and the opening 61 is formed in the lid member 6. The airbag body 4 expands to the occupant side inside the passenger compartment 2 from this opening 61, and the upper body of the occupant sitting properly in the seat is protected and restrained.

Effect

With this embodiment, the following kinds of effects can be obtained.

(Effect 1) The support ribs 151 are provided on the inside surface of the leg part 34. This makes it possible to have the root part 35a on the flange part 33 side of the hinge part 35 protected by the support ribs 151.

For that reason, the airbag body 4 is deployed on the interior of the airbag lid reinforcing member 31, and when guided to follow the leg part 34 while inflating, the airbag body 4 directly rubs the root part 35a on the flange part 33 side of the hinge part 35 (the cloth of the airbag body 4 gives shearing force to the hinge part 35), and it is possible to prevent damage to the root part 35a using the support ribs 151.

Also, a plurality of the support ribs 151 are provided having gaps 152 in the width direction of the leg part 34. By doing this, the contact part of the airbag body 4 on the support ribs 151 is distributed in a plurality of locations, so it is possible to avoid having the support ribs 151 put a burden on the airbag body 4.

In a case when there are no support ribs 151 in the present embodiment, this kind of damage to the root part 35a of the hinge part 35 by the airbag body 4 occurs more easily on the occupant side (rear side) at which the leg part 34 is longer than with the front window side (front side) where the leg part 34 is shorter. This is because when the leg part is short, the airbag body 4 contacts the door part 32 early, so rubbing of the root part 35a and the airbag body 4 does not occur easily, and in contrast to this, when the leg part 34 is long, the airbag body 4 contacting the door part 32 and stopping is relatively late, so rubbing of the root part 35a and the airbag body 4 occurs easily.

Also, at the positions between support ribs 151 (parts without ribs), during molding, the clamping unit 110 of the molds 103, 104 grips the part of the hinge part 35 between the support ribs 151 and fixes the position. For that reason, the positional relationship between the root part 35a of the hinge part 35 and the support rib 51 is kept in a suitable state. Therefore, the following situations, for example, can be avoided: the position of the hinge part 35 (hinge member 54) inside the molds 103, 104 being skewed due to the resin pressure (injection pressure) of the molten resin 136, which may cause the hinge part 35 being pushed into the inside of the support rib 151 and being completely buried in the support rib 151, and the molten resin 136 entering the top side of the part of the hinge part 35 (root part 35a) protruding from the flange part 33. Accordingly, it is possible for the support ribs 151 to exhibit their original function (function of preventing damage to the hinge part 35, for example).

Actually, with the hinge member 54 not being completely exposed at the end surface 33a of the flange part 33, it is possible for a part of the hinge member 54 to be buried inside the support rib 151 at the flange part 33 side. However, even in this case, it is possible to prevent the complete burial of the hinge member 54 inside the support rib 151, so it is possible to ensure exposure from the resin of the upper part of the hinge member 54 in the range facing from the tip 151a of the support rib 151 to the end surface 33a of the flange part 33. Because of that, the root part 35a is positioned further to the outside than the tip 151a of the support rib 151 (see FIG. 4, FIG. 5, and FIG. 6), and protection of the root part 35a is ensured.

(Effect 2) The support rib 151 may also use the obtuse angle 154 for the support part 153 with respect to the hinge part 35. By doing this, when the airbag body 4 is deployed and passes through the position of the apex of the support rib 151 (corner part of the support rib 151 inside edge part and upper edge part (support part 153)), tearing force input to the airbag body 4 by the apex of the support rib 151 (piercing force on the rib apex by pressure of the airbag body 4 itself) is mitigated, so it is possible to lower the risk of a hole opening in the airbag body 4.

(Effect 3) It is also possible to provide the extra length support part 155 on the support rib 151. This makes it possible to directly support and fix the side surface of the leg part 34 of the extra length part 52 in a wide range. This makes it possible to always keep the extra length part 52 in a stable state.

(Effect 4) With the mold device for manufacturing 101 of the airbag lid reinforcing member 31, it is possible to obtain the same action and effects as noted above.

(Effect 5) With the manufacturing method of the airbag lid reinforcing member 31, it is possible to obtain the same action and effects as noted above. At this time, a plurality of the support ribs 151 having gaps 152 in the width direction of the leg part 34 are placed at the inside surface of the leg part 34, and by doing molding to place the root part 35a of the hinge part 35 at the position of the apex of the support rib 151, the hinge part 35 is fixed by being gripped from above and below by the clamping unit 110 of the molds 103, 104 at the position where there are no support ribs 151, so creeping of the hinge part 35 to the inside of the support rib 151 at the position of the support rib 151 (both sides are fixed by gripping by the clamping unit 110 of the molds 103, 104) is suppressed.

EXPLANATION OF CODES

4: Airbag body; 23: Cleavage line; 31: Airbag lid reinforcing member; 32: Door part; 33: Flange part; 34: Leg part; 35: Hinge part; 52: Extra length part; 54: Hinge member (net); 101: Mold device for manufacturing; 103: Mold (lower mold); 104: Mold (upper mold); 110: Clamping unit; 151: Support rib; 152: Gap; 153: Support part; 154: Obtuse angle; 155: Extra length support part; 156: Recess for forming support rib (recess); X: Vehicle front-rear direction; Y: Vehicle width direction; and Z: Vertical direction.

The invention claimed is:

1. An airbag lid reinforcing member comprising:
    a door part configured and arranged to open and close;
    a flange part made of resin and surrounding an outer periphery of the door part;
    a leg part made of resin arranged on a lower side of the flange part; and
    a hinge part constituted by a hinge member connecting the flange part and the door part so that the door part opens and closes with respect to the flange part, the hinge member being a different member from the flange part wherein
    an inside surface of the leg part defines a plurality of support ribs supporting the hinge member from a lower surface side of the hinge member, the support ribs being arranged with a gap between adjacent ones of the support ribs in a width direction of the leg part,
    a first portion of the hinge member is buried in the flange part,
    in each portion of the hinge member on the support ribs, in a region between a tip of each of the support ribs and an end surface of the flange part, at least an upper part in a thickness direction of the hinge member is exposed from the support ribs,
    a lower part in the thickness direction of the hinge member is attached to a support part of each of the support ribs, the support part being an upper edge part of each of the support ribs, such that, during deployment of an airbag body, the lower part in the thickness direction of the hinge member is peeled from the support part of each of the support ribs, and a boundary part with an end surface of the flange part in the hinge member becomes a fulcrum for rotation, and
    a second portion of the hinge member positioned between adjacent support ribs is exposed from the support ribs and the flange part.

2. The airbag lid reinforcing member according to claim 1, wherein
    the hinge member is a net.

3. The airbag lid reinforcing member according to claim 1, wherein
    the door part has a first door part placed on a vehicle front side with respect to a cleavage line, and a second door part placed on a vehicle rear side with respect to the cleavage line,
    the hinge member has
        a vehicle front hinge part connecting the first door part and the flange part, and
        a vehicle rear hinge part connecting the second door part and the flange part,
    the leg part is configured and arranged to support an airbag body so that a distance from a center position of a vehicle front-rear direction of the airbag body to the vehicle rear hinge part is longer than a distance from the center position to the vehicle front hinge part.

4. The airbag lid reinforcing member according to claim 1, wherein
in each of the support ribs, an angle formed between an upper edge part in contact with the hinge member and an inside surface of a corresponding support rib is an obtuse angle.

5. A method for manufacturing an airbag lid reinforcing member including a door part configured and arranged to open and close, a flange part surrounding an outer periphery of the door part and a leg part arranged on a lower side of the flange part, the method comprising:
forming a hinge member in the flange part and the door part by insert molding using a mold for which a molding space is formed corresponding to the door part, the flange part, and the leg part,
the mold having
an upper mold for molding a top surface side of the door part and the flange part, and
a lower mold for molding a lower surface side of the door part and the flange part, and the leg part, the lower mold defining a plurality of recesses on a part for molding an inside surface of the leg part, the recesses being indented in a direction away from the flange part
gripping the hinge member between the upper mold and a part between adjacent recesses of the lower mold during the insert molding.

\* \* \* \* \*